United States Patent [19]

Selby

[11] 4,348,982
[45] Sep. 14, 1982

[54] DISPOSABLE CAT RELIEF CHAMBER

[76] Inventor: Jonathan W. Selby, P.O. Box 103, Telford, Pa. 18969

[21] Appl. No.: 146,235

[22] Filed: May 5, 1980

[51] Int. Cl.³ .............................................. A01K 29/00
[52] U.S. Cl. ............................................. 119/1; 220/8
[58] Field of Search .......................... 119/1, 19; 220/8

[56] References Cited

U.S. PATENT DOCUMENTS

| | | | |
|---|---|---|---|
| 2,083,868 | 6/1937 | Rottman | 220/8 |
| 3,016,042 | 1/1962 | Curn, Jr. | 119/19 |
| 3,084,667 | 4/1963 | Felhofer et al. | 119/19 |
| 3,885,523 | 5/1975 | Coleman | 119/19 |
| 3,890,930 | 6/1975 | Clark | 119/1 |
| 4,010,888 | 3/1977 | Gilbert | 119/19 |
| 4,029,048 | 6/1977 | Gershbein | 119/19 |
| 4,111,157 | 9/1978 | Haugen | 119/19 |
| 4,120,264 | 10/1978 | Carter | 119/1 |

*Primary Examiner*—Jay N. Eskovitz
*Attorney, Agent, or Firm*—Duffield & Lehrer

[57] ABSTRACT

This invention relates to a disposable cat litter chamber. Being unique in nature this design provides increased sanitation features, minimized odors, and disposability. The box may be formed in various shapes, but the preferred embodiment is that of a "milk carton" type construction, only somewhat taller and elongated. The cat enters the chamber through a flexible expansion type door at either or both ends. This chamber remains entirely sealed at all times except for slits in the door. Windows for light emission would be glazed with cellophane or equivalent. All excretions and resulting odors are confined within the chamber. This invention also totally eliminates the unsightliness of conventional cat boxes and also prevents any litter from being expelled out of the box during use. The chamber can be made of cardboard or other suitable material so that the entire unit may be disposed of after use. This feature prevents any necessity for direct or even visual human contact with the litter. This invention claims within its scope and spirit the potential to be opened up for utilizing disposable, removable trays, until the entire unit is disposed of.

5 Claims, 6 Drawing Figures

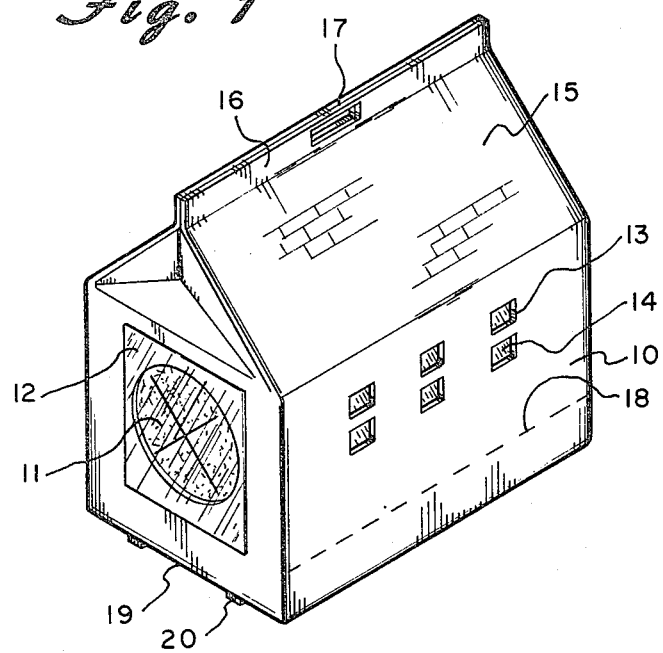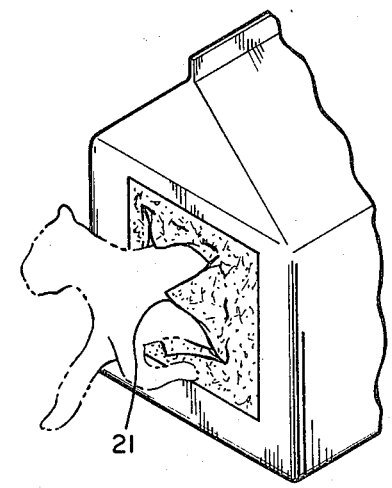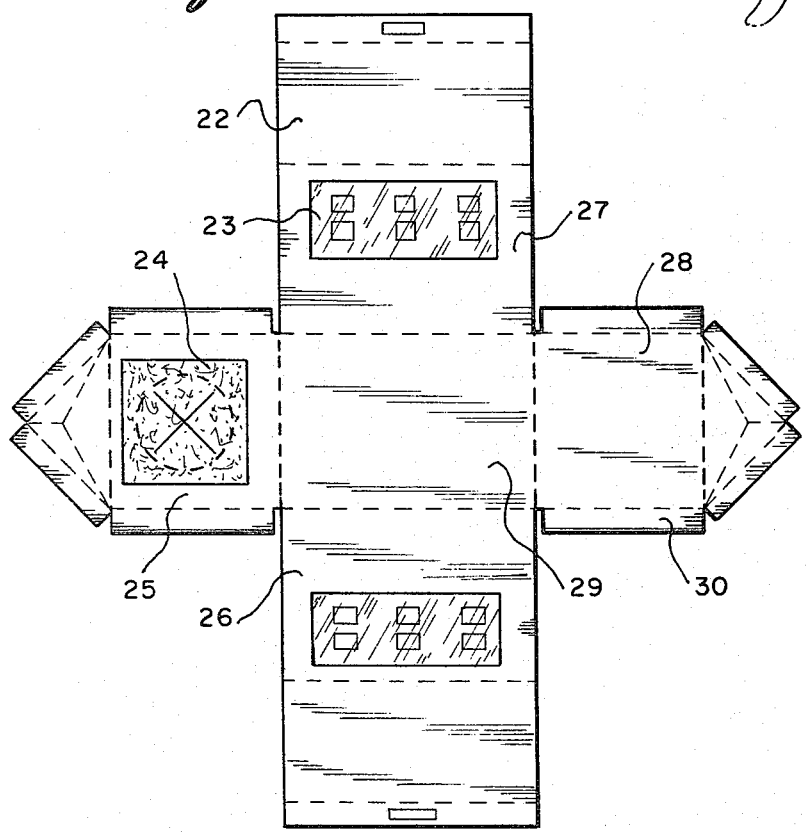

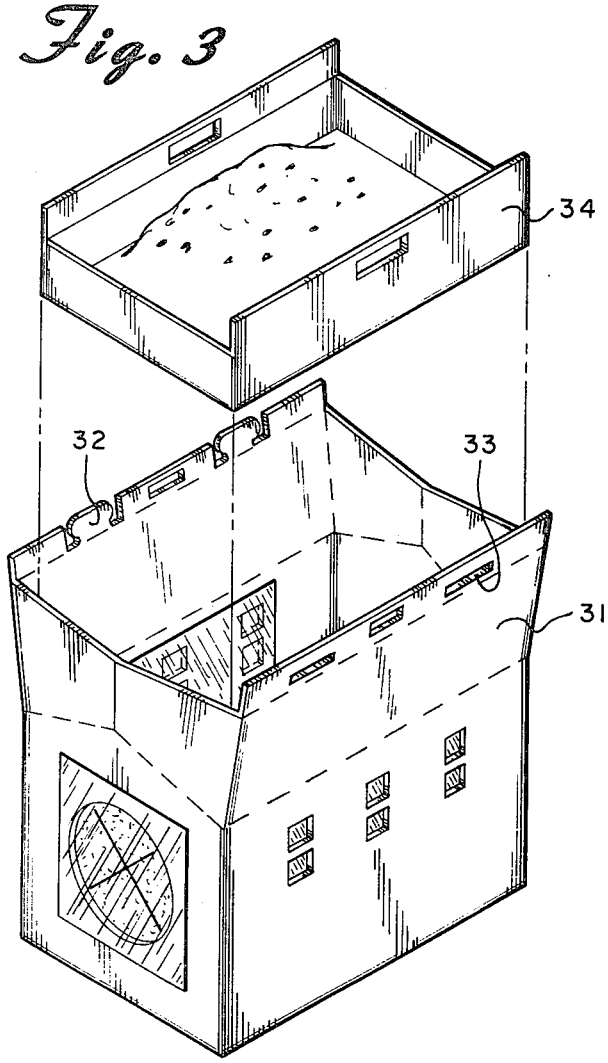
Fig. 3
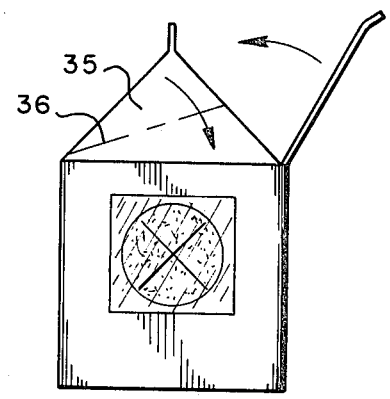
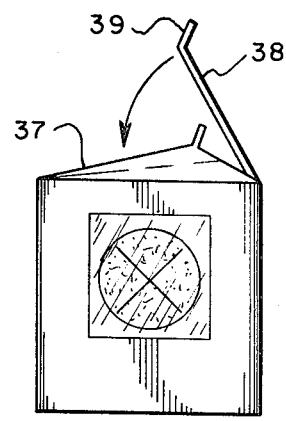
Fig. 4
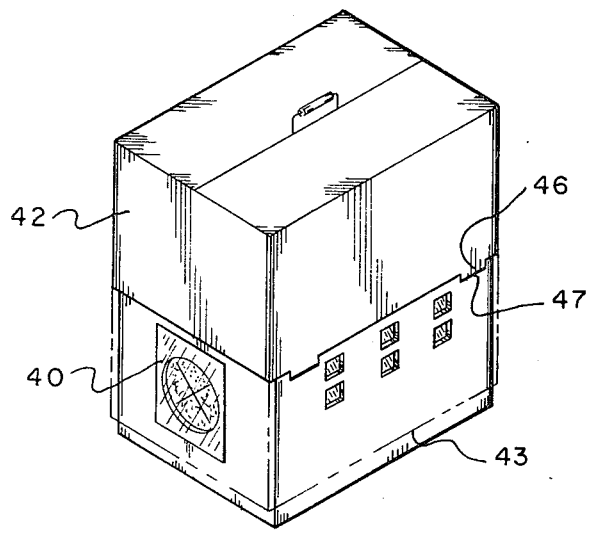
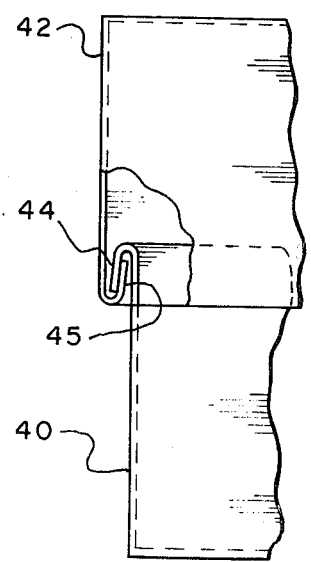
Fig. 5

DISPOSABLE CAT RELIEF CHAMBER

BACKGROUND OF THE INVENTION

1. Field of Invention

This invention relates to a totally enclosed and totally disposable cat litter receptacle. The cat enters the chamber through a flexible expansion type door and utilizes the confined litter. After reasonable use the entire unit may be disposed of.

2. Prior Art

There have been several attempts to provide a practical and economical cat litter receptacle. The most common element of prior art being the absorbant cat litter, which this invention also incorporates. The use of cat litter, though, has certain inherent drawbacks, which prior inventions have resolved only a few of.

The problems are 1. odor; 2. unsightliness; 3. expulsion of the litter outside the receptacle; 4. the necessity for human contact in varying degrees with a potentially contaminated substance; 5. leakage from the receptacle; 6. disposability and 7. portability of the unit; and, 8. the effort required on the part of the pet owner to utilize the receptacle.

Two examples of prior art, which attempt to resolve the aforementioned problems are: U.S. Pat. No. 3,745,975, issued July 17, 1973 to Stephen J. Prucha and U.S. Pat. No. 4,164,314 issued Aug. 14, 1979 to Allen C. Edgar. These inventions somewhat resolve the aforementioned problems 5, 6, and 7, and several other similar inventions could be cited in solving certain of the other related problems, but it is the object and accomplishment of this invention to solve all of the associated problems.

OBJECTS OF THE INVENTION

Therefore the objects of this invention are:

1. To prevent all odor from escaping at all times by providing a flexible expansion type door that is activated by the cat itself, and only as it enters and exits, and at the same time remains virtually air-tight around the cat while it passes through the opening.

2. To prevent the pet owner from having to view the excretions at any time. This is accomplished by a covered entrance, and by locating the entrance, (and optional windows) along the sides as opposed to the top of the chamber. The present invention also lends itself to being printed or shaped in such a way as to be aesthetically pleasing even in a prominent location about the house or while taken on a trip.

3. To be almost 100% enclosed at all times, therefore, it is next to impossible for any litter to be propelled out of the chamber. The expansion type door also tends to knock off any litter that might be clinging to the cat's body or paws as it exits the chamber.

4. To prevent any necessity for human contact with the receptacle and especially its contents, except for the initial placement and final disposing of the unit itself.

5. To prevent any leakage of the contents through or from the container. This is accomplished by being totally self-contained, having interlocking flaps, and lined with wax or other conventional sealer.

6. To be readily disposable, being made from an inexpensive material such as cardboard which provides additional convenience and sanitation advantages.

7. To be lightweight, attractive, sanitary, and allowing a handle as an integral part of the unit, it is equally conducive for portability within the house or to be taken on outings or when traveling.

8. To be totally self-contained and sealed from the time the consumer receives the invented product, this invention provides greatly increased convenience in utilizing and disposing of the chamber.

SUMMARY OF INVENTION

This invention is a totally enclosed and disposable cat relief chamber containing absorbant material common to the art. The chamber, as implied by name, is sealed having a door and optional light emitting windows. The small animal, or cat, passes in and out of this chamber through a rubber, or equivalent, flexible expansion type door located along the sides. It is generally rectangular in shape with a peaked top as a house, and may have a handle to carry it.

The invention is such that it provides increased sanitation and other advantages over existing methods. These advantages are apparent from the preceding background comparison to prior art and from the following description and accompanying drawings.

BRIEF DESCRIPTION OF DRAWINGS

FIG. 1 is an isometric view of the exterior of the preferred embodiment of the assembled invention.

FIG. II shows a flat pattern of the interior of the invention prior to being formed into a box.

FIG. III is an isometric view of the exterior of a variation of the assembled invention when it is modified to open at the top in order to utilize removable, disposable trays.

FIG. IV shows a variation of the peak of the chamber which allows it to be folded to a horizontal plane, when necessitated by space requirements as in a supermarket as opposed to a retail department store which has more floor space.

FIG. V is an isometric view of the exterior of a variation of the assembled invention when it is formed by a "box over box" method when necessitated for storage reasons.

DETAILED DESCRIPTION

FIG. I

The preferred embodiment presented in the figures shows that the pet relief chamber 10 is partially filled with a granular, absorbant material to a proportional depth noted by the dotted line 18. The chamber 10 is rectangular in shape with a peaked roof 15, and a sealed ridge 16, which a handle 17, is an integral part of. The entire chamber can be easily manufactured according to conventional "milk-carton" techniques, common to the art. This standard method would also provide a wax (or equivalent) sealer throughout the chamber, to retain any leakage.

The chamber 10 is provided with a rubber (or equivalent) flexible type door 11 which spreads open and closed about the cat's body as it pushes through the opening 21. The door 11 can be made in varying degrees of sophistication, the simplist of which would be made by splitting the center of a square of rubber, in an "X" shape, and gluing this rubber covering to the inside of the chamber over the preferably round opening. This door is covered with a cellophane 12 (or equivalent) to seal the unit until it is ready to be used, at which time the consumer need only puncture this cellophane seal and the unit becomes functional.

Windows 13 are also provided in the dye cutting of the cardboard and are covered with a cellophane sheet 14 which is glued over the window cut-outs from the inside of the chamber. These windows will allow varying amounts of light to be emitted to the interior of the chamber depending on their size.

The bottom of the chamber 19 has "peal-off" adhesive strips 20 to aid holding the unit in place, against the floor. This is especially useful in cases where a larger or more restless animal may use the chamber.

FIG. II

The chamber is manufactured from a flat form 22 at which time the cellophane window coverings 23, and rubber door 24, would be applied. The sides of the chamber 25, 26, 27 and 28 are folded up 90° from the base 29 and connected by staples and/or gluing of the flaps 30, as common to the art of carton making. The absorbant cat litter would then be added prior to sealing of the remaining peak section in a fashion like the lower section is sealed.

FIG. III

There are several methods of manufacturing the peaked portion of the chamber 31 which fall within the scope and spirit of the preferred embodiment of the herein described invention. It is understood, and illustrated for clarification, that by having interlocking tabs 32, and matching slots 33, that the upper portion of the chamber could be opened periodically to allow for the capability of utilizing removable and disposable trays 34. This minor change would allow increased versatility of the invention in certain applications where economy would be preferred over convenience.

FIG. IV

This variation of forming the top portion of the chamber shows how the end portion of the peak 35 can be scored 36 to allow it to collapse so that one side of the peak 37 may be folded down, and the opposite flap 38, folded down over it, creating a flat top during shipping and storage. Flap 38 has adhesive along the edge 39 to hold and seal it down until the chamber is ready to be used by the consumer.

FIG. V

The preferred embodiment of this invention is to provide a totally disposable and totally enclosed (during use), cat litter receptacle. This is accomplished by utilizing a box form, to contain the litter and act as a chamber, (of a variable nature), a flexible door 40, and cellophane covered light openings 41. Within this spirit and scope a further variation to those previously mentioned would be a "box over box" method, which also embodies the novel features of this invention. This method provides an upper box 42 which is open on the underside and slides down over the open top end of the lower box 43. This variation of producing the invention allows it to be approximately half size for shipping and shelving with the upper box closed down over the lower box. This method also serves to protect and seal the unit in shipping, especially the cellophane covered openings. The boxes would be constructed as common to the art and sealed on the inside with a conventional sealer. The boxes have flaps 44 and 45 turned under which serve to interlock and seal the center seam while in the uplifted position and being used. The upper box is held in that position by tabs 46 which slip into slots 47 along the top edge of the lower box. After the chamber has been used for a reasonable length of time the upper box is forced down over the lower box and the unit is disposed of in its entirety.

Having described my invention in detail and the preferred embodiment thereof, as well as the obvious modifications or variations, the following is claimed:

1. A totally enclosed cat relief chamber comprising:
   a lower box shaped portion including a bottom and upstanding side, front and back walls, the top of said lower portion being open;
   an upper box shaped portion including a top and downwardly extending side, front and back walls, the bottom of said upper portion being open, the inner dimensions of said upper portion being slightly greater than the outer dimensions of said bottom portion so that said upper portion can be telescoped over said bottom portion;
   said upper portion being movable between a lower position wherein the side, front and back walls of said lower portion are substantially covered by said upper portion and a raised position wherein said side, front and back walls of said lower portion are exposed;
   means for preventing said upper portion from moving upward past said raised position;
   means for locking said upper portion in said raised position, and
   a door located in one of said walls, said door being comprised of a material which will open to allow an animal to pass there through and which will then return to its closed position.

2. A cat relief chamber as claimed in claim 1 wherein said means for preventing upward movement includes interlocking turned under flaps located on the free ends of said walls.

3. A cat relief chamber as claimed in claim 1 further including a plurality of windows in one of said walls, said windows being covered by a plastic film material capable of transmitting at least some light there through.

4. A cat relief chamber as claimed in claim 1 further including a handle attached to said top.

5. A cat relief chamber as claimed in claim 1 further including adhesive means on the underside of said bottom for maintaining the same on a surface.

* * * * *